United States Patent [19]
Collins et al.

[11] Patent Number: 6,103,324
[45] Date of Patent: Aug. 15, 2000

[54] METHODS OF CONSTRUCTION OF EVACUATED GLAZING

[75] Inventors: Richard Edward Collins, Rouse Hill; Jian-Zheng Tang, Merrylands, both of Australia

[73] Assignee: The University of Sydney, Australia

[21] Appl. No.: 09/218,982

[22] Filed: Dec. 22, 1998

Related U.S. Application Data

[62] Division of application No. 08/571,913, Mar. 27, 1996, Pat. No. 5,902,652.

[30] Foreign Application Priority Data

Jun. 30, 1993 [AU] Australia ................................ PL9708

[51] Int. Cl.⁷ ...................................................... E06B 3/66
[52] U.S. Cl. ........................... 428/34; 428/120; 428/192; 156/107; 156/109; 52/786.1
[58] Field of Search .......................... 428/34, 120, 192; 156/107, 109; 52/786.1, 786.13

[56] References Cited

U.S. PATENT DOCUMENTS

| | | |
|---|---|---|
| 1,370,974 | 3/1921 | Kirlin . |
| 2,168,216 | 8/1939 | Kennedy et al. . |

(List continued on next page.)

FOREIGN PATENT DOCUMENTS

| | | |
|---|---|---|
| 290981 | 5/1969 | Australia . |
| 16618 | 7/1969 | Australia . |
| 610672 | 12/1987 | Australia . |
| 91/02878 | 3/1991 | Australia . |
| 0 047 725 | 9/1981 | European Pat. Off. . |
| 0 421 239 A2 | 4/1991 | European Pat. Off. . |
| 921 946 | 2/1946 | France . |
| 1 154.921 | 6/1956 | France . |
| 2 277 964 | 9/1973 | France . |
| 2 294 315 | 12/1974 | France . |
| 907 821 | 3/1954 | Germany . |
| 29 18 581 | 11/1980 | Germany . |
| 200585 | 4/1937 | Switzerland . |
| 588 008 | 2/1975 | Switzerland . |
| 950839 | 2/1964 | United Kingdom . |
| 1141281 | 1/1969 | United Kingdom . |
| 1 251 592 | 1/1970 | United Kingdom . |
| 2 095 290 | 9/1982 | United Kingdom . |
| 90/00364 | of 0000 | WIPO . |
| WO 87/03327 | 12/1985 | WIPO . |
| WO 93/15296 | 1/1992 | WIPO . |

*Primary Examiner*—Donald Loney
*Attorney, Agent, or Firm*—Kennedy Covington Lobdell & Hickman

[57] ABSTRACT

A thermally insulating glass panel comprises two spaced-apart sheets of glass enclosing a low pressure space and interconnected by a glass solder edge seal and an array of support pillars, wherein the glass sheets are sized or configured, or both, such that their edges are not in registration, and, at any point around the periphery of the panel, the edge of one of the sheets extends beyond the edge of the other in order to provide a peripheral stepped cavity in which solder glass material for forming the edge seal is deposited prior to being melted and fused. A method of forming the edge seal for a thermally insulating glass panel comprises the steps of: (a) preparing first and second sheets of glass such that when they are brought together their edges are not in registration, at any point around the periphery of the panel the edge of one of the sheets of glass extending beyond the edge of the other; (b) depositing a strip of solder glass around the periphery of the panel on the extending edges of the glass sheets; (c) heating the panel to melt the solder glass such that it runs between the glass sheets; and (d) cooling the panel to solidify the solder glass.

8 Claims, 1 Drawing Sheet

U.S. PATENT DOCUMENTS

| | | |
|---|---|---|
| 2,198,578 | 4/1940 | Hazelton, Jr. et al. . |
| 2,749,579 | 6/1956 | Shaw . |
| 2,896,272 | 7/1959 | Latenser . |
| 3,027,607 | 4/1962 | Badger et al. . |
| 3,472,640 | 10/1969 | Stockdale . |
| 3,778,126 | 12/1973 | Wilson . |
| 3,778,127 | 12/1973 | Langston, Jr. et al. . |
| 3,914,000 | 10/1975 | Beckerman et al. . |
| 3,947,260 | 3/1976 | Salisbury . |
| 3,961,871 | 6/1976 | Kurio . |
| 3,990,201 | 11/1976 | Falbel . |
| 4,038,797 | 8/1977 | Hermann et al. . |
| 4,125,390 | 11/1978 | Kawai et al. . |
| 4,184,480 | 1/1980 | Kenny . |
| 4,186,723 | 2/1980 | Copploa et al. . |
| 4,312,457 | 1/1982 | Allaire . |
| 4,359,042 | 11/1982 | Belentepe et al. . |
| 4,393,105 | 7/1983 | Kreisman . |
| 4,683,154 | 7/1987 | Benson et al. . |
| 4,786,344 | 11/1988 | Beuther . |
| 5,009,218 | 4/1991 | Bächli ............... 428/34 |
| 5,124,185 | 6/1992 | Kerratal ............... 428/34 |
| 5,270,084 | 12/1993 | Parker . |

# METHODS OF CONSTRUCTION OF EVACUATED GLAZING

This is a divisional U.S. patent application claiming priority under 35 U.S.C. §120 from allowed U.S. patent application Ser. No. 08/571,913 filed Mar. 27, 1996 for *Methods of Construction of Evacuated Glazing*, now U.S. Pat. No. 5,902,652 which is a national patent application of international patent application serial no. PCT/AU94/00305 filed Jun. 7, 1994, which in turn claims priority under 35 U.S.C. §119 to Australian patent application serial no. PL 9708 filed Jun. 30, 1993.

The invention described in this specification concerns an improvement to the design of thermally insulating glass panels. These panels typically comprise two spaced apart sheets of glass enclosing a low pressure space and interconnected by an edge seal and an array of support pillars. The panels are used for glazing, and such thermally insulating windows are generally referred to as evacuated glazing.

BACKGROUND

Thermally insulating panels are typically constructed by depositing a strip of solder glass around the periphery of the glass sheets, depositing an array of support pillars onto one or other of the sheets of glass, bringing the sheets together or permitting them to move together, heating the panels to melt the solder glass around the periphery so that the two sheets settle onto the pillars, and then cooling the panel to solidify the edge seal. The panel is the evacuated by pumping out through a tube positioned either through one of the glass sheets or through the edge seal, and finally the pump-out tube is melted and sealed off.

The improvement concerns the edge seal, and in particular a method of constructing a thermally insulating glass panel with a superior edge seal, and a panel incorporating the superior seal.

Several conditions must be satisfied in the construction of evacuated glazing. First, it is necessary to produce an hermetic (leak-free) edge seal around the periphery of the panel. Second, in order to prevent the glass sheets from being forced into contact with each other, by the large atmospheric pressure forces acting, it is essential to include an array of support pillars within the glazing. Third, the space between the glass sheets must be evacuated to a high level, and this level of vacuum maintained over the life of the glazing. Fourth, in order to reduce radiative heat flow through the glass, a low emittance coating is applied to the inner surfaces of one or both sheets of glass.

One of the methods of forming the edge seal around the periphery of evacuated glazing is to use a low melting point glass (solder glass). In order to manufacture such an edge seal, solder glass is deposited as a liquid slurry onto the surface of one or both of the glass sheets, around the edges. The glass sheets are brought together and the entire assembly is heated to a temperature at which the solder glass melts, wets the surface of the glass sheets, and flows to produce an hermetic seal between the sheets.

One of the difficulties is that even at the high temperatures used the solder glass possesses a relatively high viscosity, and it does not flow readily between the glass sheets. If there is too much solder glass in the gap between the sheets, it may not flow out of the gaps sufficiently to allow the upper sheet to settle down onto the pillars during the edge sealing process. This leads to large tensile stresses in the glass sheets near their edges when the vacuum is eventually created.

SUMMARY OF THE INVENTION

The invention provides a method of forming the edge seal for a thermally insulating glass panel comprising two spaced apart sheets of glass enclosing a low pressure space interconnected by an edge seal and an array of pillars. The method includes the steps of:

(a) preparing first and second sheets of glass such that when they are brought together their edges are not in registration, and at any point around the periphery of the panel the edge of one of the sheets of glass extends beyond the edge of the other;

(b) depositing a strip of solder glass around the periphery of the panel on the extending edges of the glass sheets;

(c) heating the panel to melt the solder glass such that it runs between the glass sheets; and (d) cooling the panel to solidify the solder glass.

In this way solder glass does not intrude between the sheets before it is melted, thereby overcoming the current problem in conventional construction methods.

The first and second glass sheets are conveniently prepared by making one slightly smaller than the other. For instance the upper glass sheet may be 5 mm less than the lower on all sides; in other words 10 mm less in each orthogonal direction.

The solder glass strip may be deposited on the extending edges such that it bridges the gap between the sheets and contacts the end edge of the other sheet.

Another advantage of the method is that the solder glass flows into the gap between the two glass sheets a uniform distance all around the periphery of the panel. The edge seals are therefore formed with a relatively constant width which gives the finished panels an excellent appearance and a high mechanical strength. Typically the width of the bonded region between the glass sheets is between 3 and 10 mm.

The invention may further be defined as providing a thermally insulting glass panel comprising two spaced apart sheets of glass enclosing a low pressure space interconnected by an edge seal and an array of pillars wherein: the glass sheets are sized or configured, or both, such that their edges are not in registration, and at any point around the periphery of the panel the edge of one of the sheets extends beyond the edge of the other. Preferably one of the sheets is slightly smaller than the other, for example, by 5 mm on all sides.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1A:
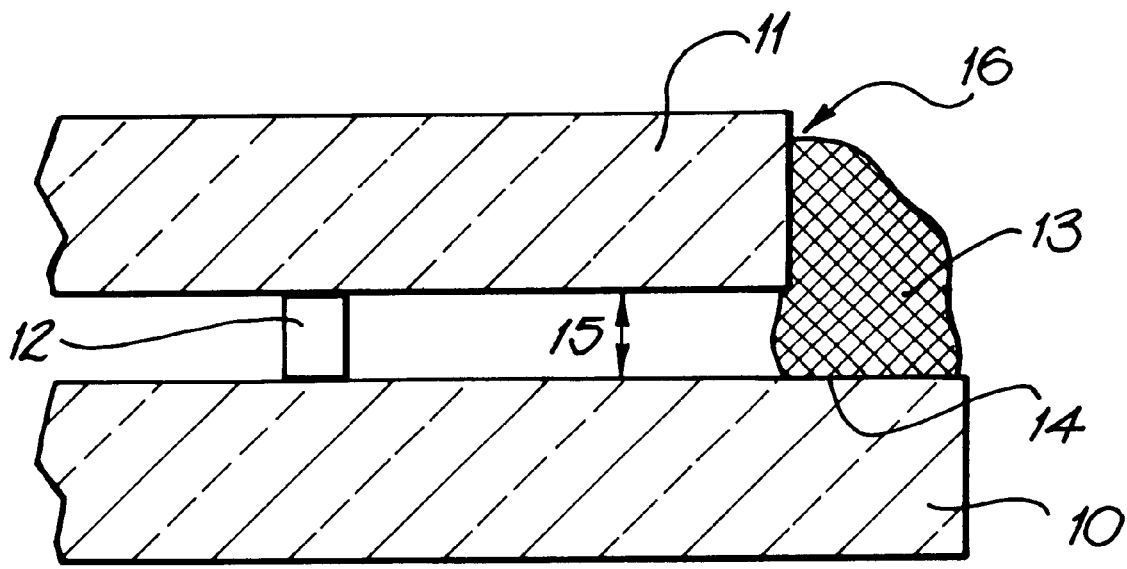
FIG. 1*a* shows a detail of the edge of a panel under construction before the solder glass is melted.
Figure 1B:
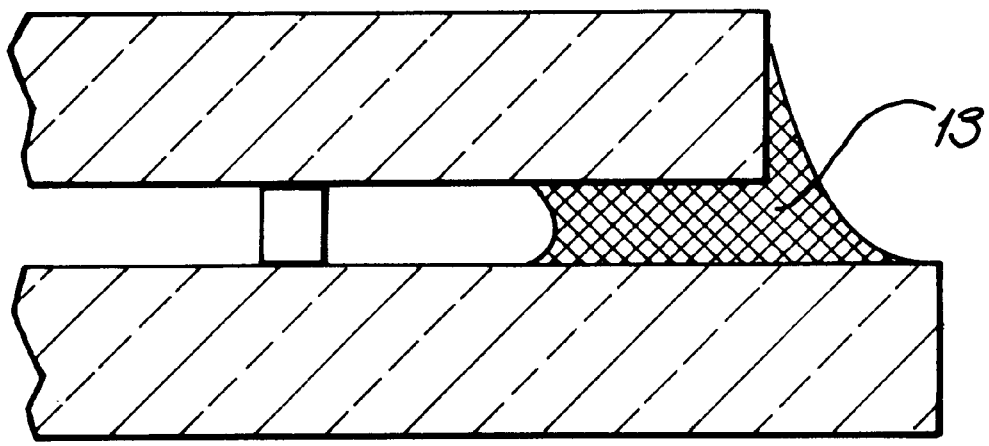
FIG. 1*b* shows the same detail after the solder glass has been melted.

The lower glass sheet 10 is slightly larger than the upper glass sheet 11 which rests on an array of support pillars 12 at a predetermined spacing above lower sheet 10. A strip of solder glass 13 is laid on the extending edge 14 by which the edge of lower sheet 10 extends beyond the edge of upper sheet 11. The solder glass is deposited either as a liquid slurry, a powder, or a rod. The strip of solder glass 13 bridges the gap 15 between the glass sheets and contacts and the end edge 16 of upper glass sheet 10.

When the construction is heated and the solder glass melts, it flows between the two glass sheets 10 and 11 by the action of capillary forces. The distance the solder glass flows can be controlled by varying the time and temperature of the process. In this way it is not necessary for solder glass between the two glass sheets to be expelled by the weight of the upper glass sheet.

It should be appreciated that although this invention has been described with reference to a specific example it need not be limited to that embodiment. For example, one glass sheet need not be a slightly different size to the other and both sheets could be the same size provided they were translated out of registration with each other in both orthogonal direction.

What is claimed is:

1. A thermally insulating glass panel comprising two spaced-apart sheets of glass enclosing a low pressure space and interconnected by a glass solder edge seal and an array of support pillars, wherein the glass sheets are sized and configured such that their edges are not in registration, and, at any point around the periphery of the panel, the edge of a first glass sheet extends beyond the edge of a second glass sheet, and wherein the glass solder edge seal comprises a first portion disposed on the respective extending edge of the first glass sheet in contact with the side of the edge of the second glass sheet, and a second portion extending from the first portion in-between the glass sheets.

2. A panel according to claim 1, wherein the second glass sheet is slightly smaller than the first glass sheet.

3. A panel according to claim 1, wherein the second glass sheet is 2 to 20 mm smaller than the first glass sheet in the lateral dimension around the periphery of the glass panel.

4. A method of forming the edge seal for a thermally insulating glass panel comprising two spaced-apart sheets of glass enclosing a low pressure space interconnected by a glass solder edge seal and an array of pillars, the method including the steps of:

a) preparing first and second sheets of glass such that when they are brought together their edges are not in registration and, at any point around the periphery of the panel, the edge of said first glass sheet extends beyond the edge of said second glass sheet;

b) depositing a strip of solder glass around the periphery of the panel on the extending edge of said first glass sheet;

c) heating the panel to melt the solder glass such that it runs between said first and second glass sheets; and d) cooling the panel to solidify the solder glass.

5. A method according to claim 4, wherein said first and second glass sheets are prepared by making said second glass sheet slightly smaller than said first glass sheet.

6. A method according to claim 4, wherein said first glass sheet overlaps said second glass sheet by between 1 and 10 mm.

7. A method according to claim 4, wherein said first glass sheet overlaps said second glass sheet by about 5 mm on all sides.

8. A method according to claim 4, wherein the solder glass strip is deposited on the extending edge of said first glass sheet such that it bridges the gap between the said two glass sheets and contacts the end edge of said second glass sheet.

* * * * *